United States Patent [19]

Evans, Jr.

[11] 4,008,476
[45] Feb. 15, 1977

[54] DIGITAL ANTENNA PATTERN GENERATOR FOR RADAR SIMULATION

[75] Inventor: Albert B. Evans, Jr., Ventura, Calif.

[73] Assignee: The United States of America as represented by the Secretary of the Navy, Washington, D.C.

[22] Filed: Oct. 3, 1975

[21] Appl. No.: 619,533

[52] U.S. Cl. ............................................. 343/17.7
[51] Int. Cl.² ......................................... G01S 7/40
[58] Field of Search .................................. 343/17.7

[56] References Cited

UNITED STATES PATENTS

| | | | |
|---|---|---|---|
| 3,403,247 | 9/1968 | Morgan et al. | 343/17.7 X |
| 3,540,046 | 11/1970 | Falk | 343/17.7 |
| 3,634,886 | 1/1972 | Synowka | 343/17.7 X |
| 3,719,812 | 3/1973 | Bishop et al. | 343/17.7 X |

Primary Examiner—T.H. Tubbesing
Attorney, Agent, or Firm—Richard S. Sciascia; Joseph M. St.Amand; William W. Cochran, II

[57] ABSTRACT

A digital antenna pattern generator for producing an electrical signal to simulate any desired antenna pattern for which the device has been preprogrammed. Read only memories are utilized which are preset according to applicable intelligence data to read out desired radar antenna patterns as the memory locations are addressed in seriatim. In the preferred embodiment of the invention, the read only memories are sequentially addressed in accordance with the angular displacement across the antenna beam pattern. In an alternative embodiment, a free-running antenna pattern generator is disclosed in which the beam width, dead time and lobe rate is adjusted. Both systems convert the digital pattern generated by the read only memories into an appropriate output analog signal.

11 Claims, 3 Drawing Figures

Fig. 2. FREE RUNNING ANTENNA PATTERN GENERATOR

DIGITAL ANTENNA PATTERN GENERATOR FOR RADAR SIMULATION

BACKGROUND OF THE INVENTION

The present invention pertains generally to signal generators and more specifically to radar antenna pattern generators. In general, radar simulations are used to evaluate the performance of electronic countermeasures equipment and other testing devices. Two different types of antenna patterns are generated in these simulations. The first of these, the free-running scan pattern, is used in open-loop testing to evaluate receivers. Presently, three methods are employed to obtain these scan patterns. The first of these methods utilizes sine waves and pulse generators to provide crude simulations. A second method uses tape recordings of replicas of scan patterns which provide high quality simulation of particular radar transmissions but require expensive FM tape recorders and the added expense incurred for field operations in producing the tapes. The third method utilizes commercial pattern generators which provide generic type patterns typical of standard radar transmissions but do not provide simulations for any particular pattern.

The second type of antenna pattern generated is used in closed-loop tests to evaluate total performance of countermeasures equipment under laboratory conditions. Two methods are presently used to produce these closed-loop antenna patterns. The first method utilizes diode function generators associated with analog computers. The second method uses a photoformer flying spot scanner in conjunction with the photographic plates of the particular pattern to be generated. Both methods provide a fairly high quality antenna pattern as a function of an analog antenna sweep function. However, the reliability has been inconsistent and the production of photographic slides of the particular patterns to be generated has been expensive. Additionally, the added costs of an oscilloscope and a photo multiplier tube are required in the photoformer flying spot scanner technique.

SUMMARY OF THE INVENTION

The present invention overcomes the disadvantages and limitations of the prior art by providing an improved digital antenna pattern generator for radar simulation. The present invention provides a high quality antenna pattern signal by use of preprogrammed integrated circuit read only memory devices. These devices are sequentially addressed in one embodiment by an up/down counter means to read out the preprogrammed information representative of the antenna pattern. In another embodiment of the invention, a D/A converter converts an analog input signal to a digital signal which sequentially addresses the read only memory. In both devices, a D/A converter converts the digital antenna pattern to an analog signal which is subsequently smoothed out by an active filter.

It is therefore an object of the present invention to provide an improved digital antenna pattern generator for radar simulation.

It is also an object of the present invention to provide a digital antenna pattern generator for producing a high quality output pattern signal.

Another object of the present invention is to provide a digital antenna pattern generator which is inexpensive to construct and capable of providing an antenna pattern signal for any desired antenna pattern.

Another object of the present invention is to provide a digital antenna pattern generator which is simple in operation, small in size, and reliable in operation.

Other objects and further scope of applicability of the present invention will become apparent from the detailed description given hereinafter. The detailed description indicating the preferred embodiments of the invention is given only by way of illustration since various changes and modifications within the spirit and scope of the invention will become apparent to those skilled in the art from this detailed description. The foregoing Abstract of the Disclosure is for the purpose of providing a non-legal brief statement to serve as a searching and scanning tool for scientists, engineers and researchers, and is not intended that it should be used in interpreting or in any way limiting the scope or fair meaning of the appended claims.

DETAILED DESCRIPTION OF THE PREFERRED EMBODIMENT

Figure 1:
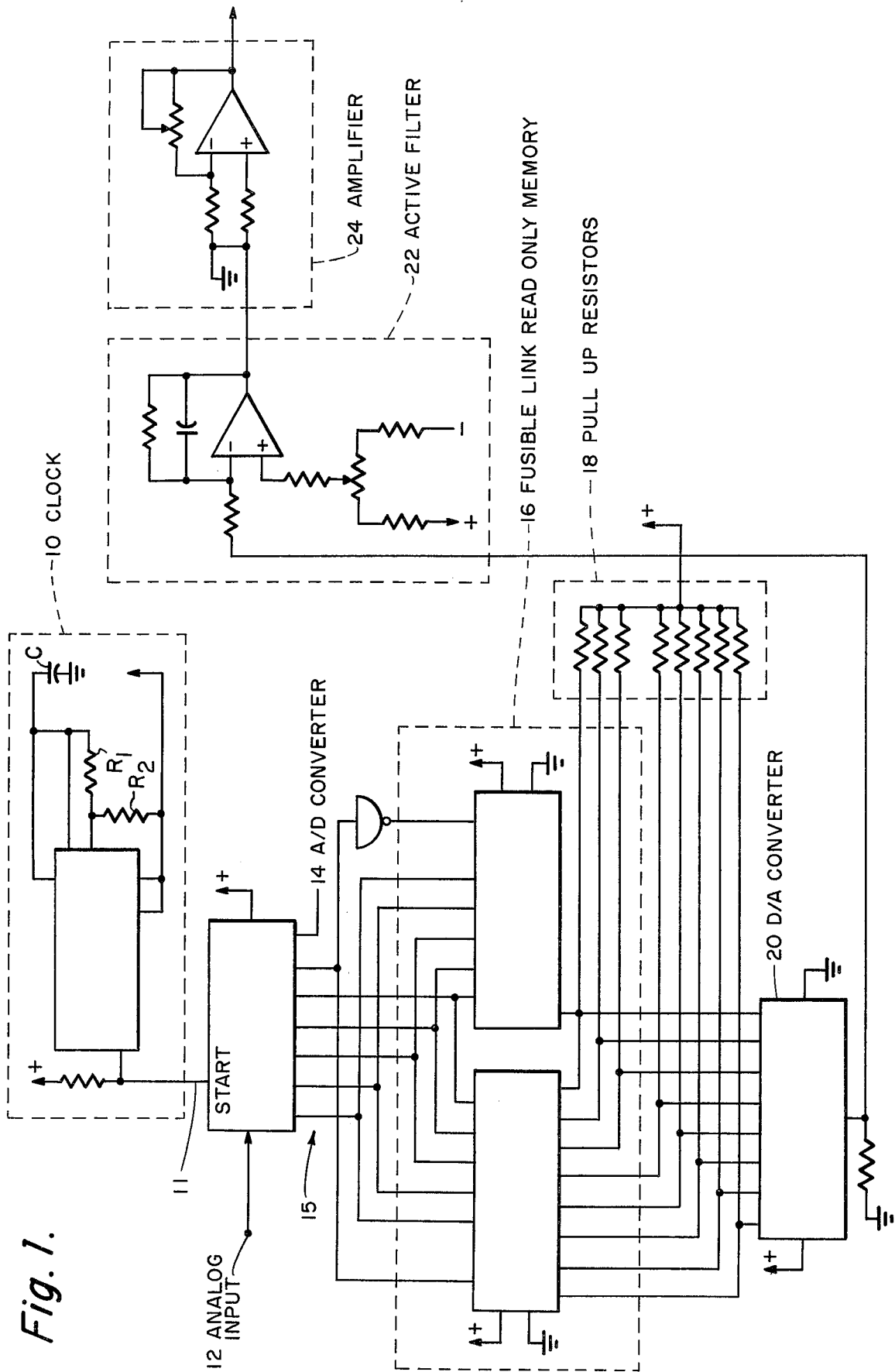
FIG. 1 is a schematic diagram of the preferred embodiment of the invention.

FIG. 1 is a schematic diagram of the closed loop system for generating an antenna pattern comprising the preferred embodiment of the invention. An analog input signal 12 is applied to the A/D converter 14, representative of angular displacement across an antenna beam pattern. Such a signal could, for example, constitute a sawtooth waveform produced by a signal generator. Clock 10 produces clock pulses having a frequency determined by R1, R2 and C. Pulses from clock 10 are applied along input 11 to A/D converter 14 to signal the A/D converter 14 to sample. The frequency of the clock pulses also determines the rate at which the analog input 12 is sampled. A digital signal is produced on one of the outputs 15 of the A/D converter 14 in accordance with the magnitude of the sampled analog input 12. Outputs 15 are applied to the address inputs of the fusible link read only memories 16. The read only memories are preprogrammed by the user with ordinary test equipment according to the particular antenna pattern desired. For example, in test and evaluation procedures for certain jamming devices, particular antenna patterns simulating enemy radar antenna patterns must be generated to determine if the jamming device is operating properly for that particular pattern. Various antenna patterns are selected and programmed into the read only memory 16 from applicable intelligence data. In the closed loop system of FIG. 1, the fusible link read only memory 16 is programmed by storing in memory the magnitude of the radar antenna pattern at a series of angular displacements across the antenna beam pattern determined from the applicable intelligence data corresponding to sequential memory address locations in the fusible link read only memory 16. The magnitude of the analog input signal 12 therefore represents an angular displacement across the antenna beam pattern and read only memory 16 is addressed at the memory location corresponding to that angular displacement, to read out the magnitude of the antenna beam pattern which has been preprogrammed into the read only memory 16 at that point. Pull up resistors 18 are required at the output of read only memory 16 to provide proper supply voltage. D/A converter 20 converts the digital pulses from the fusible link read only memory 16 to an analog signal which is filtered in active filter 22 and amplitude adjusted in amplifier 24 for proper coupling to its output.

Figure 2:
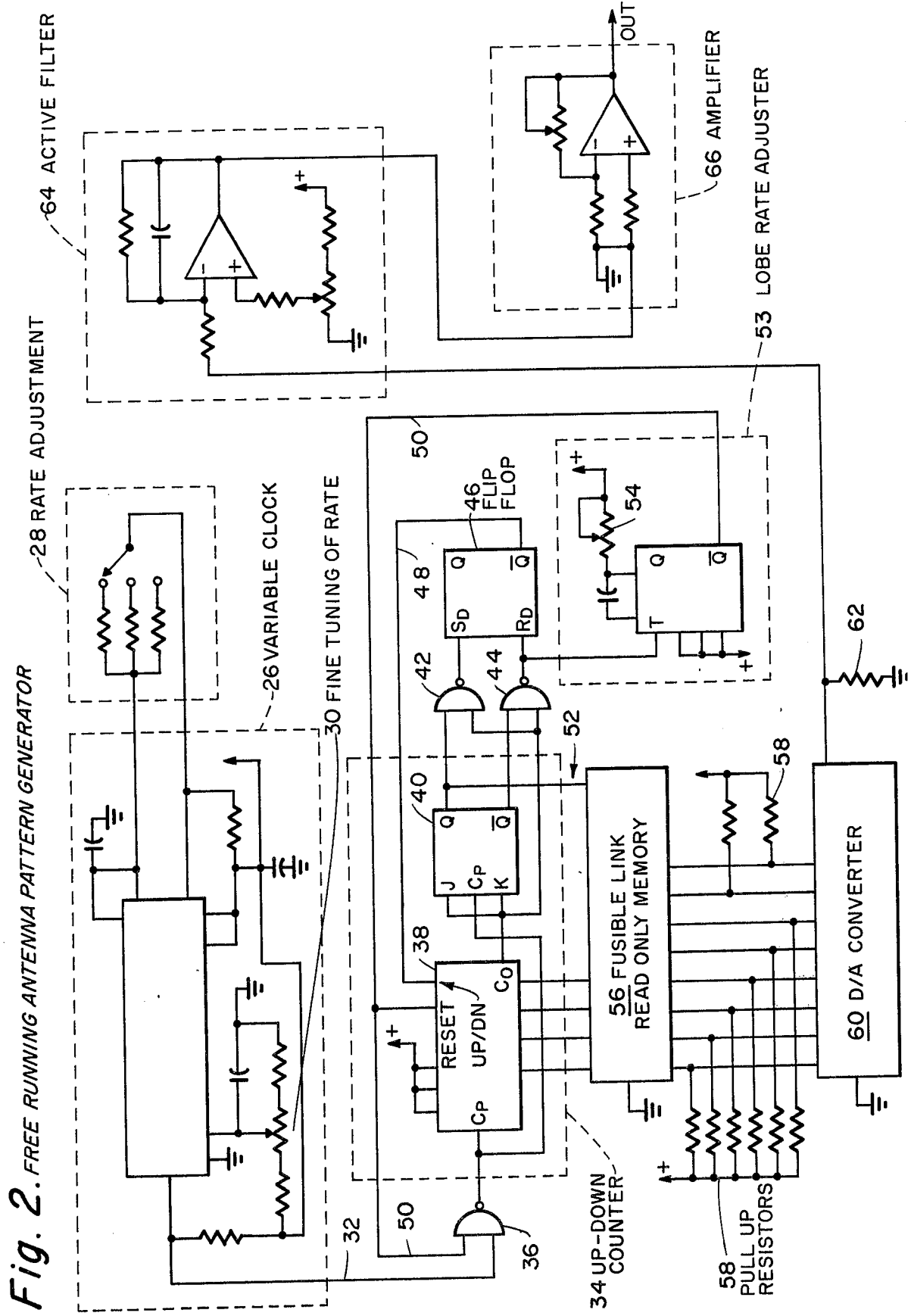
FIG. 2 is a schematic diagram of an alternative embodiment of the invention.
Figure 3:
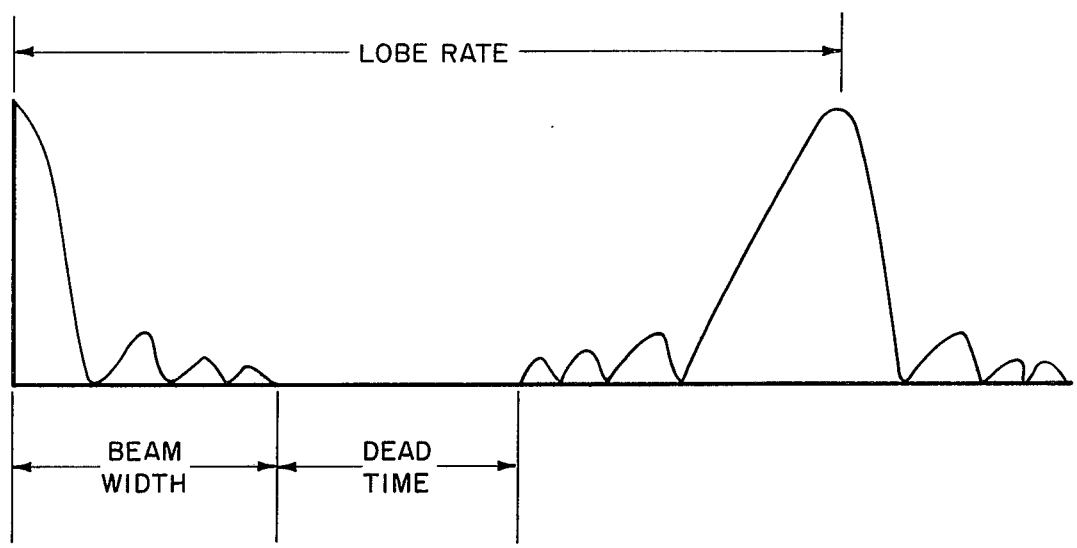
FIG. 3 is a plot of a typical antenna beam pattern produced by the alternative embodiment of the invention.

An alternative embodiment comprising an open-loop, free-running antenna pattern generator is shown in FIG. 2. Variable clock 26 produces clock pulses on output 32 having a frequency range which can be selected by the rate adjustment device 28. The variable clock 26 comprises a voltage controlled oscillator wherein the frequency is tuned by adjusting the resistor shown at 30. The clock pulses are applied to the up-/down counter 34, which, as shown in FIG. 2, can count up to five binary bits; counter 38 counting four binary bits, and counter 40 counting one binary bit. Flip flop 46 controls the up/down count mechanism of binary counter 38 in accordance with output logic circuitry 42 and 44. In operation, counter 38 and 40 count in a binary fashion up to the maximum count before flip flop 46 produces an output signal along line 48, signaling the counter to start counting down or subtracting the input clock pulses from the accumulated sum stored in the counter. In this fashion, the up/down counter 34 will accumulate clock pulses up to its maximum count (in this case, 32) and then count down sequentially to zero, providing sequential addressing of fusible link read only memories 56 via outputs 52. The lobe rate adjustment device 53 provides a pulse at output 50 having a duration determined by the adjustable resistor 54. The control pulse produced by the lobe rate adjuster 53 acts to cut off the up/down counter 34 when the up/down count accumulated is equal to zero. This is accomplished by applying the control pulse to output 50 which is connected to NAND gate 36 at the input of the counter 38 such that the clock pulses along line 32 are not applied to the input of the up/down counter 34 during the duration of the control pulse. Simultaneously, the control pulse is applied along output 50 to the reset of the up/down counter 34 such that its count is reset to zero. The pulse width of the control pulse produced by the lobe rate adjuster 53 therefore determines the dead time, as shown in FIG. 3. The beam width is determined by the rate adjustment 28 in the variable clock 26 so that the total lobe rate, as shown in FIG. 3, can be set by adjusting the beam width by variable clock 26 and the dead time by lobe rate adjuster 53. The fusible link read only memory 56 is programmed in the same manner as the read only memory 34 of FIG. 1 in accordance with applicable intelligence data. The pull-up resistors 58 are required at the output of the read only memory 56 to provide proper supply voltage. The digital outputs of the fusible link read only memory 56, representative of the digital antenna pattern, are applied to a converter 60 for conversion into an analog signal. This analog signal is then impedance adjusted by resistor 62 and filtered in active filter 64. The output of the active filter 64 is then impedance adjusted in amplifier 66.

The embodiments of the present invention therefore provide an inexpensive electronic circuit for producing high quality, free-running and closed loop pattern functions. Both inventions allow preprogramming of the read only memory devices in accordance with applicable intelligence data at a fraction of the cost and time of conventional devices for producing these outputs. Furthermore, in the free-running antenna pattern generator disclosed in FIG. 2, the beam width, dead time and, consequently, the lobe rate can be independently adjusted to more nearly match the antenna pattern desired. Therefore, the present invention provides an output antenna pattern of a quality comparable to the best of the conventional antenna pattern generators as well as providing flexibility in the programming and shaping of the pattern to fit any desired pattern.

Obviously many modifications and variations of the present invention are possible in light of the above teachings. For instance, the memory capacity of the fusible link read only memory 56, shown in FIG. 2, and 16, shown in FIG. 1, can be expanded or contracted according to the number of data points required in producing the antenna pattern. Similarly, the up/down counter 34 can be expanded or contracted to store a different number of binary bits, as desired.

It is therefore to be understood that within the scope of the appended claims the invention may be practiced otherwise than as specifically described.

What is claimed is:
1. An antenna pattern generator for producing an output signal representative of an antenna beam pattern comprising:
   a. means for converting an analog waveform into a digital signal having a magnitude proportional to angular displacement across said antenna beam pattern;
   b. read only memory means addressed in accordance with said magnitude of said digital signal to produce a digital pattern signal having a preselected magnitude proportional to said antenna beam pattern;
   c. means for converting said digital pattern signal into an analog antenna beam pattern signal; and
   d. means for filtering said analog antenna beam pattern signal to produce said output signal representative of said antenna beam pattern.

2. The antenna pattern generator of claim 1 wherein said means for converting an analog waveform includes a variable clock for setting the rate at which said analog waveform is sampled.

3. The antenna pattern generator of claim 1 wherein said read only memory means comprises a programmable fusible link read only memory.

4. The antenna pattern generator of claim 1 wherein said means for filtering comprises an active filter.

5. An antenna pattern generator for generating an antenna pattern signal comprising:
   a. variable clock means for producing clock pulses representative of the beam width of said antenna pattern signal;
   b. up/down counter means for accumulating a sum of said clock pulses up to a predetermined value and subsequently subtracting said clock pulses from said sum down to zero;
   c. lobe rate adjustment means for producing a variable pulse width control pulse to turn off said up/down counter means;
   d. read only memory means for producing a digital antenna pattern signal from memory locations sequentially addressed by said up/down counter means; and e. means for converting said digital antenna pattern signal to said antenna pattern signal.

6. The antenna pattern generator of claim 5 wherein said means for converting comprises a digital to analog converter and an active filter.

7. The antenna pattern generator of claim 6 wherein said lobe rate adjustment means comprising means for producing said control pulse only when said sum of said up/down counter is zero.

8. The antenna pattern generator of claim 7 wherein said read only memory means comprises a programmable fusible link read only memory.

9. The antenna pattern generator of claim 5 wherein said lobe rate adjustment means comprising means for producing said control pulse only when said sum of said up/down counter is zero.

10. The antenna pattern generator of claim 9 wherein said read only memory means comprises a programmable fusible link read only memory.

11. The antenna pattern generator of claim 5 wherein said read only memory means comprises a programmable fusible link read only memory.

* * * * *